Figure 1:
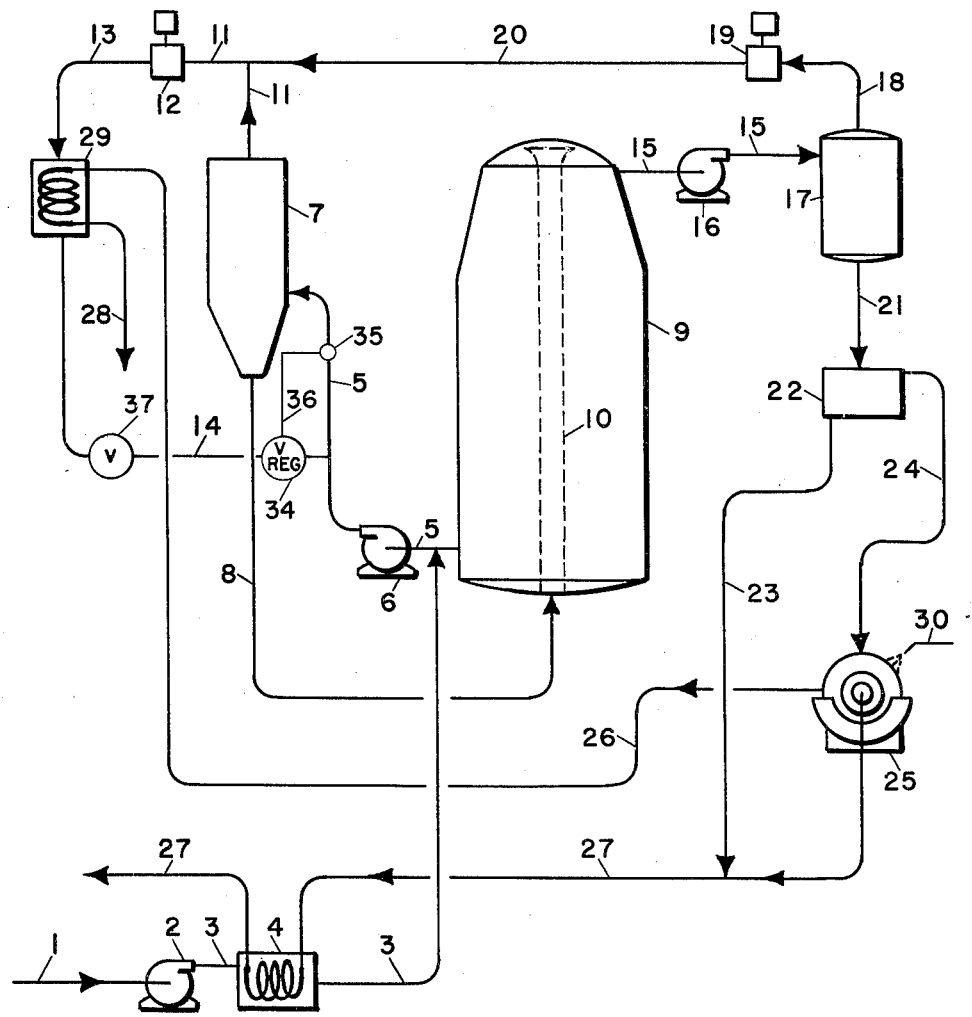

Aug. 29, 1961  J. W. PIKE  2,997,856
METHOD AND APPARATUS FOR PRODUCING FRESH WATER FROM SALINE WATER
Filed March 6, 1959  2 Sheets-Sheet 1

INVENTOR.
JOHN W. PIKE
BY
Arthur W. Francis
AGENT

INVENTOR.
JOHN W. PIKE

2,997,856
METHOD AND APPARATUS FOR PRODUCING FRESH WATER FROM SALINE WATER
John W. Pike, 80 Broadview Ave., New Rochelle, N.Y.
Filed Mar. 6, 1959, Ser. No. 797,603
22 Claims. (Cl. 62—58)

This invention relates to water purification and more particularly to the production of fresh water i.e. relatively salt free water, from saline water, such as sea water, by crystallization.

The problem of producing fresh water from salt or saline water is the subject of ever increasing interest and study. Vast areas of the world depend for their future development on an economical method of converting salt water to fresh water that can be used for irrigation and a source of potable water.

Processes for separating fresh water from salt water have in the past depended principally on evaporation. Such processes require transfer of heat energy through heat exchange surface with the attendant difficulties of scaling and rapidly fouling heat exchangers. The energy requirements of evaporative type processes are very large because of the very high latent heat of evaporation of water.

The present invention is based on the principle of crystallizing ice crystals from a salt solution under controlled conditions, whereby a separation of relatively salt free ice crystals is accomplished from a saline mother liquor. The ice crystals after melting yield fresh water suitable for irrigation or human consumption. Although other processes have been based on the crystallization principle such processes have proven uneconomical. In large measure processes employing the freezing or crystallization technique have met failure due to the difficulty of preventing occlusion of salt water in the ice crystal. The water produced after melting the ice crystal has not been sufficiently pure for agricultural or human use, and has been produced at high costs.

Therefore, a fundamental object of this invention is the production of fresh relatively salt free water by a process of ice crystallization under controlled conditions.

A further object of this invention is to provide an economical process whereby the necessary cooling of the saline solution to the crystallization temperature is accomplished by direct contact with the refrigerating medium without intervening heat transfer surface.

Other objects and advantages will be apparent from the following description and accompanying drawings.

Briefly stated, the present invention consists of mixing a supercooled saline solution at a temperature within the metastable condition with a saline mother liquor having ice crystals suspended therein within an ice crystal classification zone and accomplishing a separation thereby. Fresh water from the solution in the metastable condition is thereby caused to deposit on and expand the size of the ice crystals. By maintaining carefully controlled conditions of crystallization the ice formed is relatively free of salt. After washing and melting of the ice crystals a fresh water, relatively free of salt, is obtained.

A feature of this invention is the maintenance of a hydraulically classified suspension of ice crystals in the mother liquor within a crystallization zone. The suspended or fluidized bed of ice crystals is maintained in a classified state in a manner such that a gradation of crystal sizes exist from top to bottom of the crystallization zone. The size classification is maintained by directing the flow of supercooled saline solution downward against the upwardly rising ice crystals. The smaller ice crystals having less of a buoyant force than the large crystals are caused thereby to remain in fluidized suspension in the lower portion of the crystallization zone until they have attained sufficient size and buoyancy to rise to the upper portion of the crystallization zone. The residence time of the ice crystals in the crystallization zone is as a consequence of the hydraulic classification regulated until the proper size of crystals is obtained. Crystals produced in the foregoing manner are large in size, easily filtered, and most important, contain only minor quantities of occluded salt.

Supercooling of the saline solution is preferably done by means of vaporizing a volatile liquid hydrocarbon in contact with the saline solution. After vaporization and cooling, the vapor is recompressed and condensed for a repetition of the cycle. The supercooling can also be done in heat exchangers using brine or other refrigerants as the cooling medium.

The word saline as here employed denotes a solution containing as a major dissolved mineral component the salt sodium chloride. However, other minerals may also be present in the solution, and the present invention includes within its scope the production of fresh water from saline solutions in which a group of mineral salts may be present. The word saline solution is here defined as encompassing solutions described as brackish and also sea water. Such solutions may contain salts such as calcium chloride, magnesium chloride and similar salts formed from the alkali earth metals and the halogens.

The practice of the invention requires cooling a saline solution into the metastable condition. The term is employed in its commonly accepted definition and represents an unstable phase relationship wherein the solution is cooled to below its solubility limit relative to a dissolved component. In the metastable condition appreciable spontaneous crystallization does not result until a disturbance occurs which caused the metastable system to revert to stability. In the present invention the suspended ice crystals in the saline mother liquor serve as nuclei upon which the supercooled saline solution deposits ice and tends therefore to approach stability.

The invention is preferably practiced employing a saline feed solution having a salt concentration less than that corresponding to the eutectic mixture for the solution. Using the system sodium chloride and water as an example, a eutectic occurs at a salt concentration of 23.31% by weight. When a solution having a sodium chloride content less than the eutectic value is cooled to the solubility or freezing curve, ice crystals are formed. However, if a solution having more sodium chloride than corresponding to the eutectic point is cooled, the solid phase separating on cooling to the solubility curve consists of hydrated forms of sodium chloride. For the purpose of obtaining an ice crystal substantially devoid of salt, the saline solution should therefore have a salt concentration less than the eutectic concentration.

The invention will be further described with reference to the accompanying drawings forming a part of this specification and illustrating the preferred embodiment of the invention wherein:

FIGURE I is a schematic diagram of the process in a preferred form;

FIGURE II is a longitudinal sectional view of the crystallizer illustrating the crystal growth therein.

Referring now to FIGURE I a deaerated saline water feed stream from the ocean or an underground source is fed through line 1 into pump 2. The saline water is pumped through exchanger 4 in line 3 and finally to the suction of pump 6. In passing through exchanger 4 the feed water is cooled to a temperature within the range 22–30° F. The exact temperature within this range will depend on the temperature of the coolant. In a preferred embodiment of the process the coolant is an effluent mother liquor solution, which, dependent on the mineral concentration of the feed water may be at a temperature between the limits of 22–28° F. The relationship of mother liquor temperature and mineral concentration will later become apparent. However, although the process is more economical when the feed is cooled by effluent mother liquor, cooling may be by other media having a sufficiently low temperature.

In line 5 the cooled feed water is mixed with a circulating mother liquor comprising dissolved solids, ice and water. The mother liquor now mixed with fresh feed is pumped by circulating pump 6 to a higher pressure in order to discharge into evaporator 7. A volatile liquid refrigerant is introduced through line 14 into the pressured mixture in line 5. The volatile liquid refrigerant is controlled by an automatic valve 34 in line 14 responsive in its action to a temperature element 35 located in line 5. The temperature of the element controls the action of the valve 34 in admitting or throttling the flow of volatile liquid into line 5 to maintain the temperature of line at the desired temperature. An impulse transmitting conduit 36 serves to transmit impulses from temperature element 35 to automatic valve 34. The conduit may transmit electrical or hydraulic impulses for control. Line 14 is also provided with a manually operable valve 37. The pressure in line 5 is maintained sufficiently low to cause vaporization of the liquid refrigerant. The heat required for vaporization of the refrigerant is extracted from the mixture causing the mixture to cool. The mixture is cooled to the metastable condition and preferably within the range .05 to 1.5° F. The mixture in metastable condition is now slightly below the phase equilibrium temperature or initial freezing point of the mixture and is now in a metastable condition where although comparative stability exists at the moment, the mixture is inherently unstable and a potential exists for a reversion of the supercooled solution to ice. The refrigerant vapor is separated from the mixture in evaporator 7 wherein the vapor leaves through line 11. The vapor is compressed by compressor 12 and as a compressed gas is delivered through line 13 to heat exchanger 29 where the compressed gas is cooled and liquefied for redelivery through line 14 for a repetition of the cooling process.

The mixture after cooling within the range .05 to 1.5° F. exists as has been described in a supercooled metastable condition. The mixture in the metastable condition is below the freezing point or phase equilibrium temperature of the saline solution and some ice crystals will form. However, by limiting the cooling to within the temperature range described, an excessive number of ice crystals or nuclei are prevented from forming.

The subcooled mixture from the evaporator 7 flows through line 8 into crystallizer 9 through center pipe 10. In the preferred process evaporator 7 is located at a vertical height greater than crystallizer 9. The mixture as described previously is pressurized and elevated by circulating pump 6 from crystallizer 9 to evaporator 7 from whence the cooled mixture is returned by gravity to crystallizer 9. However, a difference in elevation is not necessary for operation of the process. Where evaporator 7 and crystallizer 9 have relatively the same elevation a liquid transporting device such as a pump may be located in line 8 for returning liquid to the crystallizer 9.

A fluidized suspension of crystals is hydraulically maintained in crystallizer 9. The supercooled water entering the crystallizer through center pipe 10 tends to solidify on the crystals present building these crystal nuclei into larger crystals. By maintaining close temperature control of the supercooled circulating solution and limiting the cooling of the circulating stream a minimum of new nuclei are formed. Since the ice crystal density is approximately 0.9 and the mother liquor density greater than 1 the ice crystals tend to rise to the top of the crystallizer 9. The subcooled mixture entering through center pipe 10, however, enters near the top of the crystallizer 9 and flows downward reacting against the upwardly flowing ice crystals. By maintaining a downward velocity in this manner, preferably, but not limited to the range 0.10 ft.–0.25 ft. per second the crystals may be maintained in suspension. Finally large crystals rise to the top of the crystallizer 9 and fine crystals are forced to the bottom. The fine crystals and the containing mother liquor are circulated through the circulating loop for a repetition of the cooling cycle. The ice crystals are preferably removed from the crystallizer continuously. It has been found advantageous to allow the crystals to concentrate until the crystals constitute 20–40% by weight of the total batch in the crystallizer.

Upon attaining the proper weight percent of crystals, the mother liquor containing the suspended crystals is discharged through line 15 into pump 16 from whence it is forced into evacuation chamber 17 to remove residual refrigerant. Evacuation chamber 17 is maintained at a pressure dependent on the refrigerant used. Preferably the pressure is less than the pressure in evaporator 7 whereby residual refrigerant evaporates by reason of the low pressure and is returned to the suction of compressor 12. In the process illustrated in FIGURE I compressor 19 is connected by line 18 to evacuation chamber 17 whereby refrigerant vapors flashed in evacuation chamber 17 are compressed and delivered by line 20 to compressor 12. It should be understood that compressor 19 can be replaced by other vapor evacuating devices such as an ejector.

The slurry underflow from the evacuation chamber 17 comprising ice crystals and mother liquor discharges through line 21 into gravity separator 22. Evacuation chamber 17 is illustrated as elevated relative to gravity separator 22. Line 21 thus serves as a barometric leg when evacuation chamber 17 is maintained under vacuum and effectively seals against air entering evacuation chamber 17 while allowing the mixture of ice crystals and mother liquor to be discharged to gravity separator 22. When the process is operated with little or no difference in elevation of evacuation vessel 17 over gravity separator 22, a pump or other similar pressure increasing device may be employed in line 21.

Gravity separator 22 is the primary mother liquor ice separating device and may be of conventional design for this type of equipment. In a simple form gravity separator 22 may be a large tank where after storage for a length of time, ice crystals are concentrated in the top portion of the tank and decanted off through line 24. The underflow less concentrated in ice crystals and consisting predominantly of mother liquor is removed through line 23. It is possible to combine in evacuation vessel 17 the dual function of refrigerant removal and mother liquor ice separation, although for economic reasons this is not preferred.

The mixture of ice and mother liquor which is now a thick slurry, passes through line 24 and is delivered to filter 25, where a final separation of mother liquor is made. Instead of a filter a counter current wash method may also be employed. The filtered ice crystals are washed with fresh water delivered through pipe 30. After washing, the ice crystals are melted in refrigerant condenser 29. The fresh water produced on melting thereby contains less than 500 p.p.m. dissolved solids. The final product is then delivered from line 28. The mother liquor leaving the gravity separator 22 through line 23 and residual mother liquor leaving filter 25 through line 27 may be joined and used to cool the incoming saline water feed in exchanger 4.

In the case of some less volatile refrigerants supplementary methods of refrigerant removal are sometimes required. Such methods consist of heating the mother liquor after ice removal to vaporize the refrigerant from the mother liquor. The vapor is subsequently compressed and condensed for reinjection into line 5. In a modification not illustrated the effluent mother liquor stream in line 27 after exchanger 4 is heated and the resulting vapors returned to the suction of compressor 19.

Referring again to crystallizer 9 the water in crystallizing to ice and reverting to a lower energy level rejects heat of fusion to the surrounding solution. A quantity of heat equivalent to the heat rejected must be extracted from the solution in crystallizer 9. This heat is removed from the circulating mother liquor circulated by pump 6. In order to remove the total heat of fusion and to restrict cooling to the metastable condition, a large volume of liquid must be circulated. The circulation rate must be adjusted depending on the salt concentration of the feed solution and the degree of cooling of the circulating stream. In general, the circulating rate varies between the limits of 100 to 500 times the quantity of feed solution.

The relationship between the circulation rate and the salt concentration of the feed can be best understood by observing that the total heat extracted from the crystallizer 9 is directly related to the product of the circulation rate and the temperature decrease of the circulating stream. However, it is an important part of this invention to limit the temperature decrease on cooling to within the metastable condition. Where because of a high salt concentration the limit of the temperature where a metastable condition exists is close to the freezing temperature, the degree of cooling possible is limited and in compensation, the circulation rate must be increased.

The preferred refrigerants for employment with the process are immiscible or only slightly miscible with the saline solution. Where a partially miscible refrigerant is employed, additional equipment is required to separate the refrigerant from the mother liquor in order to prevent loss of refrigerant from the system. In addition to the requirement of immiscibility, it is important that the refrigerant have the proper vapor pressure at the crystallization temperature of the process. It is advantageous if the vapor pressure of the refrigerant within the temperature range 20–30° F. is at least equal to atmospheric pressure of 14.7 p.s.i.a. By maintaining a pressure above atmospheric, equipment size is reduced and the danger of leakage of air into the equipment is less. This is an important consideration when the refrigerant and air form explosive mixtures.

Certain paraffinic and olefinic hydrocarbons have the required vapor pressure characteristics. Among these are butane, propane, propylene, ethylene, and ethane. Hydrocarbons having the desired vapor pressure relationships are therefore those members of the paraffinic and olefinic group having four or less carbon atoms in the molecule.

Although the invention has been described employing separate equipment for circulation, cooling and crystallization, it is possible to combine these functions in a single vessel. For example, a vessel can be designed to provide separate areas for vapor disengaging, refrigerant introduction, internal circulation, and crystallization. Circulation in such a vessel can be natural or forced.

FIGURE II is a longitudinal section of the crystallizer showing the gradations of ice crystals within the crystallizer and the direction of flow of the mother liquor therein.

Sub cooled mother liquor entering through pipe 8 rises vertically within the center pipe until upon leaving the open end of the pipe it is deflected by the rounded head 31 and given a downward velocity. The velocity of liquid leaving the center pipe should preferably be greater than 3.0 ft. per second.

Due to the low specific gravity of the ice crystals 33 in comparison with the mother liquor, the ice crystals rise within the crystallizer. The upward flow of crystals is resisted by the downwardly flowing mother liquor issuing from center pipe 10 and deflected downward by rounded head 31. Because of the high velocity at the discharge of central pipe 10 violent mixing of super cooled solution and ice crystals occurs. The free space velocity of the downward flowing mother liquor is preferably in the range .10–.25 ft. per second. With mother liquor flow downward within the described velocity limits, stratification of the ice crystals results according to crystal size as illustrated in FIGURE II. The upper walls 32 of the crystallizer 9 are tapered at an angle 10–15° from the vertical. Accordingly, due to the gradually increasing cross section of the crystallizer from top to the middle section, the free space velocity of the descending mother liquor gradually decreases within the limits of .10 to .25 ft. per second. An equilibrium exists whereby for a narrow range of ice crystal sizes the upward buoyant force exerted by the crystals is balanced by the downward flowing force of the solution and the crystals remain in vertical equilibrium until an increase in the crystal size destroys the equilibrium and causes the larger crystals to ascend slowly. Due to the increased velocity of the mother liquor imparted by the tapered walls in an upward direction, the ascending crystals are resisted by an increasing downward velocity force. The rate of ascent of the ice crystals is accordingly slowed and larger crystals formed. In the lower section of the crystallizer small crystals are prevented by the downward force of the descending liquor from rising and leave the crystallizer through circulation pipe 5.

It has been found that best results are obtained when crystallizer 9 has a sufficient holding volume to provide for retention of mother liquor for 0.5 to 3 hours. The retention time within the range stated provides crystals of a desired size range which may be readily separated from the mother liquor in conventional solid liquid separating equipment.

The temperature of the mother liquor ice crystal mixture in crystallizer 9 is maintained at substantially the freezing temperature of the saline feed stream. The freezing temperature of the saline feed is a function of the salt concentration as illustrated by the following table for the simple system sodium chloride and water.

| Weight percent sodium chloride: | Freezing point, ° F. |
|---|---|
| 4.14 | 27.6 |
| 5.51 | 26 |
| 6.86 | 24.4 |
| 8.21 | 22.7 |
| 9.56 | 20.8 |

It should be understood that a slightly different relationship between freezing point and solid content of the solution will be the case where other salts are present in the solution in addition to sodium chloride.

The manner in which the invention may be carried out in practice is illustrated in the following example, it being understood that this is in no way limitative and can be varied widely without departing from the invention.

*Example*

The following table lists the flows, temperature, and other process conditions applying to a fresh water production of 10,000,000 gallons per day from a feed stream at 45° F. and containing 35,000 p.p.m. of dissolved salt.

| | |
|---|---|
| Gallons of feed water per day | 20,000,000 |
| Gallons of waste liquor per day | 10,000,000 |
| Retention time, hours | 1.9 |
| Percent by weight crystals in suspension | 25 |
| Crystallization rate, pounds per hour per square foot | 250 |
| Height of crystallizer bed, feet | 30 |
| Suspension volume, cubic feet | 423,900 |
| Operating temperature of crystallizer, ° F | 28.5 |
| Heat to be removed in crystallizer, B.t.u./ hr. | 500,000,000 |

| | |
|---|---:|
| Heat to cool feed to 28.5° F., B.t.u./hr | 113,600,000 |
| Circulation rate, g.p.m | 3,000,000 |
| Temperature decrease of circulating stream, ° F | .3 |
| Ratio of feed to circulation | 1:215 |
| Refrigerant | Iso-butane |
| Iso-butane evaporated, pounds per hour | 3,000,000 |
| Approximate refrigerant compressor horsepower | 11,000 |
| Aprroximate circulating pump horsepower | 3,000 |
| Approximate plant cost, dollars per 1,000 gallon stream day | 125 |
| Total water cost per 1,000 gallons | .72 |

I claim:

1. A process for producing fresh water from saline water comprising the steps of maintaining a crystallization zone comprising a suspension of ice crystals in mother liquor, circulating a portion of the suspension of ice crystals in mother liquor extracted from the crystallization zone, supercooling said circulating suspension below the freezing point of the solution and within the metastable temperature range of the mother liquor, returning said supercooled mother liquor and ice suspension to the crystallization zone wherein fresh water from the supercooled mother liquor deposits on the suspended ice crystals, separating said ice crystals from the mother liquor, washing said ice crystals with fresh water, and melting said ice crystals.

2. A process for producing fresh water from saline water comprising the steps of maintaining a crystallization zone comprising a fluidized suspension of ice crystals in mother liquor, circulating a portion of the suspension of ice crystals in mother liquor extracted from the bottom portion of the crystallization zone, combining said circulating suspension with a saline liquor feed, supercooling said combined stream below the freezing point of the solution and within the metastable temperature range, injecting said supercooled mixture comprising a saline liquid feed and ice crystal suspension into the top portion of the crystallization zone in a downward direction countercurrent to the ascending flow of ice crystals wherein said ice crystals are stratified into sizes varying continuously from large sizes in the top portion of the crystallization zone to small sizes in the bottom crystallization zone, removing continuously mother liquor and ice crystals from the top portion of the crystallization zone, separating said ice crystals from said mother liquor, and melting said ice crystals.

3. A process according to claim 2 wherein the combined circulating suspension and saline liquid feed is supercooled by vaporizing a volatile hydrocarbon liquid in direct contact with said circulating streams.

4. A process according to claim 3 wherein the quantity of circulating suspension is within the range of 100 to 500 times the quantity of the feed stream.

5. A process for producing substantially fresh water from saline water comprising the steps of maintaining a saline mixture comprising a saline mother liquor phase and an ice crystal phase at a phase equilibrium temperature at which temperature said ice crystal phase and said mother liquor phase may coexist in stable phase equilibrium state wherein no coercion exists for the phase change of the ice crystal phase or the mother liquor phase, cooling said mixture slightly below said phase equilibrium temperature thereby coercing the formation of ice, preserving said cooled mixture for a sufficient time to cause ice to deposit on said ice crystal phase, separating said ice crystal phase from said mother liquor phase and melting said separated ice crystal phase to produce fresh water.

6. A process according to claim 5 wherein said mixture is cooled within the range .05 to 1.5° F. below said phase equilibrium temperature.

7. A process for producing substantially fresh water from saline water comprising the steps of maintaining a saline mixture comprising a saline mother liquor phase and an ice crystal phase at a phase equilibrium temperature at which temperature said ice crystal phase and said mother liquor phase may coexist in a stable phase equilibrium state wherein no coercion exists for the phase change of the ice crystal phase or the mother liquor phase, cooling said mixture slightly below said phase equilibrium temperature to a temperature where said mixture is in a metastable condition and in said metastable condition a coercion exists for the formation of ice, preserving said cooled mixture for a sufficient time to cause the formation of ice on said ice crystal phase, separating said ice crystal phase from said mother liquor phase and melting said separated ice crystal phase to produce substantially fresh water.

8. A process according to claim 7 wherein said separated ice crystal phase is washed with fresh water to remove adhering mother liquor.

9. A process for producing substantially fresh water from saline water comprising the steps of maintaining a saline mother liquor phase and an ice crystal phase at substantially phase equilibrium temperature at which temperature said ice crystal phase and said mother liquor phase may coexist in a stable phase equilibrium state wherein no tendency exists for the phase change of the ice crystal phase or the mother liquor phase, cooling a withdrawn portion of the mixture slightly below said phase equilibrium temperature, remixing the cooled withdrawn portion and said saline mixture and producing thereby a phase unstable mixture having a temperature below the mixture phase equilibrium temperature wherein a tendency exists for the formation of ice, preserving said unstable mixture for a sufficient time for ice to deposit on said ice crystal phase, separating said ice crystal phase from said mother liquor phase, washing said separated ice crystal phase with fresh water and melting said separated ice crystal phase to produce fresh water.

10. A process according to claim 9 wherein said withdrawn portion is cooled within the range .05 to 1.5° F. below the phase equilibrium temperature.

11. A process for producing substantially fresh water from saline water comprising the steps of maintaining a saline mixture comprising a saline mother liquor phase and an ice crystal phase at a sufficiently low temperature to enable the ice crystal phase to coexist in and in equilibrium with the mother liquor phase in phase stable relationship, withdrawing a portion of the saline mixture, mixing saline feed liquor with said withdrawn portion, coolng the mixture of feed liquor and the withdrawn portion slightly below the temperature at which phase equilibrium exists, reinjecting said cooled mixture in a downward direction into said saline mixture to oppose the flow of ascending ice crystals and producing thereby a metastable condition in said saline mixture where a coercion exists for the formation of ice crystals, preserving said metastable mixture in a metastable condition for a sufficient time to cause ice to deposit on said ice crystal phase, separating said ice crystal phase from said mother liquor phase and melting said separated ice crystal phase to produce fresh water.

12. A process according to claim 11 wherein said withdrawn portion and saline feed liquor is cooled within the range .05 to 1.5° F. below the temperature at which phase equilibrium exists.

13. A process according to claim 11 wherein said separated ice crystal phase is washed with fresh water prior to melting.

14. A process for producing substantially fresh water from brackish water comprising the steps of maintaining a crystallization zone comprising a suspension of ice crystals in a saline mother liquor wherein said mixture is sustained at a temperature sufficiently low to permit coexistence of the ice crystals and the mother liquor in substantially equilibrium such that no coercion exists for the reversion of ice to liquid or the formation of further ice from the mother liquor, circulating a portion of the suspension of ice crystals in mother liquor extracted from the crystallization zone, cooling said circulating suspension below said temperature at which equilibrium exists and therefore causing said circulating solution to revert to a metastable state wherein a tendency exists for the formation of ice, returning said cooled mother liquor and ice crystal mixture to the crystallization zone, retaining said cooled returned mixture and said suspension in said crystallization zone for a sufficient time to cause ice to form on said ice crystals, separating said ice crystals from the mother liquor, washing said ice crystals with fresh water and melting said ice crystals to produce substantially fresh water.

15. A process according to claim 14 wherein said circulating suspension is cooled within the range 0.5 to 1.5° F. below the temperature in said crystallization zone.

16. A process according to claim 14 wherein said cooling of the circulating suspension is accomplished by vaporizing a volatile liquid hydrocarbon in contact with said suspension.

17. A process according to claim 14 wherein said cooling of the circulating suspension is accomplished by vaporizing propane in contact with said suspension.

18. A process according to claim 14 wherein said cooling of the circulating suspension is accomplished by vaporizing butane in contact with said suspension.

19. A process for producing substantially fresh water from salt containing water comprising the steps of maintaining a crystallization zone comprising a suspension of ice crystals in a saline mother liquor wherein said mixture is sustained at a temperature sufficiently low to permit coexistence of the ice crystals and the mother liquor in substantial equilibrium such that no coercion exists for the reversion of ice to water or the formation of further ice from the mother liquor circulating a portion of the suspension of ice crystals in a saline mother liquor extracted from the bottom portion of the crystallization zone, combining said circulating suspension with a cooled saline liquor feed, cooling said combined suspension and the fresh feed within the range of .05 to 1.5° F. below said equilibrium temperature existing in said crystallization zone and thereby causing said circulating solution to revert to a metastable state wherein a coercion exists for the formation of ice, returning said cooled mother liquor and ice crystal mixture into the top portion of the crystallization zone in a downward direction countercurrent to the ascending flow of ice crystals wherein said ice crystals are stratified into sizes varying progressively from large sizes in the top portion of the crystallization zone to small sizes in the bottom of the crystallization zone, retaining said crystallization zone with admixed circulating portion for a sufficient length of time to cause ice to form on said ice crystals wherein relatively large formed ice crystals gradually ascend to the upper portion of said crystallization zone, removing said large ice crystals from said crystallization zone, and melting said large ice crystals to produce fresh water.

20. A process according to claim 19 wherein said cooling of the combined suspension and the fresh feed is accomplished by vaporizing a volatile liquid hydrocarbon in contact with said suspension and fresh feed and wherein said volatized hydrocarbon is compressed, cooled, condensed and returned for a repetition of the cycle.

21. A process for producing large ice crystals from an aqueous saline solution comprising the steps of nucleating the saline solution with small ice crystals, maintaining said nucleated solution at a temperature wherein said small ice crystals and saline solution may coexist in a stable relationship, inducing said nucleated solution into a metastable condition by a slight cooling, and preserving said nucleated metastable solution for a sufficient time for the gradual formation of large ice crystals on said small ice nuclei by deposition thereon of water from said aqueous saline solution.

22. A process for producing large relatively salt free ice crystals from an aqueous saline solution comprising the steps of nucleating the saline solution with small ice crystals, maintaining said nucleated solution at a temperature wherein said small ice crystals and saline solution may coexist in a stable relationship, inducing said nucleated solution into a metastable condition by a slight cooling within the range of .05 to 1.5° F. below said temperature of stable relationship and preserving said nucleated metastable solution for a sufficient time for gradual formation of large size ice crystals on said small ice nuclei by deposition thereon of water from said aqueous saline solution.

References Cited in the file of this patent

UNITED STATES PATENTS

| 1,991,384 | Field et al. | Feb. 19, 1935 |
| 2,081,287 | Aldridge | May 25, 1937 |
| 2,315,762 | Ax et al. | Apr. 6, 1943 |
| 2,764,488 | Slattery | Sept. 25, 1956 |
| 2,821,304 | Zarchin | Jan. 28, 1958 |

OTHER REFERENCES

Figure 2:
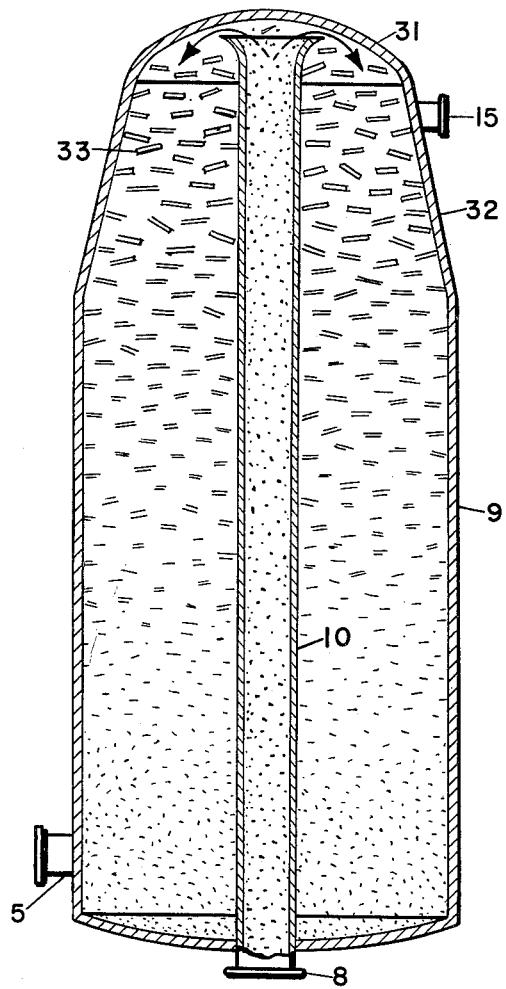

Development of a Direct-Freezing Continuous Wash-Separation Process for Saline Water Conversion, by Carrier Corporation, Report Number 23, pages 1–6 and FIGURES 1 and 2, January 1959.